(12) United States Patent
Glanzbergh

(10) Patent No.: US 8,534,829 B1
(45) Date of Patent: Sep. 17, 2013

(54) READING LENSES COMBINED WITH ADVERTISING MEDIUM FOR USE IN VENUES THAT SERVE FOOD AND/OR DRINKS OR THAT REQUIRE READING PRINTED MATTER

(75) Inventor: Mitchel I. Glanzbergh, Shadow Hills, CA (US)

(73) Assignee: Optic Cafe, Inc., Calabasas, CA (US)

( * ) Notice: Subject to any disclaimer, the term of this patent is extended or adjusted under 35 U.S.C. 154(b) by 0 days.

(21) Appl. No.: 13/134,496

(22) Filed: Jun. 9, 2011

(51) Int. Cl.
*G02C 5/00* (2006.01)
*G02C 11/02* (2006.01)
*G02C 11/04* (2006.01)

(52) U.S. Cl.
CPC *G02C 5/00* (2013.01); *G02C 11/02* (2013.01); *G02C 11/04* (2013.01)
USPC .................. 351/41; 351/51; 351/83; 351/158

(58) Field of Classification Search
CPC ............ G02C 5/00; G02C 11/02; G02C 11/04
USPC .............. 351/41, 51, 52, 54, 56, 83–87, 124, 351/154, 155, 158, 159.73, 159.74, 159.75; 235/487, 488

See application file for complete search history.

(56) References Cited

U.S. PATENT DOCUMENTS

| | | | |
|---|---|---|---|
| 5,604,548 A * | 2/1997 | Kanbar | 351/56 |
| 6,390,372 B1 * | 5/2002 | Waters | 235/487 |
| 6,982,840 B1 * | 1/2006 | Schlief | 359/802 |
| 2009/0033862 A1 * | 2/2009 | Margolis | 351/41 |
| 2011/0007264 A1 * | 1/2011 | Desheng | 351/158 |

\* cited by examiner

*Primary Examiner* — Huy K Mai
(74) *Attorney, Agent, or Firm* — Thomas I. Rozsa

(57) ABSTRACT

A combination of reading lenses placed onto a medium on which advertisements can be placed. The device can be given away free to advertisers who can advertise their products to individuals while they are visiting an eating and/or drinking establishment so the individual will be interested in purchasing the advertiser's products in addition to being able to read the menu through the lenses. The invention can also be used to advertise an advertiser's product to be inserted in other printed mediums.

3 Claims, 2 Drawing Sheets

READING LENSES COMBINED WITH ADVERTISING MEDIUM FOR USE IN VENUES THAT SERVE FOOD AND/OR DRINKS OR THAT REQUIRE READING PRINTED MATTER

BACKGROUND OF THE INVENTION

1. Field of the Invention

The present invention relates to viewing lenses which enable an individual to read small print such as menus and other food and drink listings in locations where there may be limited light and where reading may be difficult and where the individual may have forgotten to bring his/her reading glasses.

2. Description of the Prior Art

In general, reading glasses are known in the prior art. Most people have many sets of reading glasses but unfortunately, frequently mislay them or lose them or forget to bring them to facilities such as a restaurant or a nightclub. As a result, they frequently are unable to clearly read the menu and have to request information or assistance from their companion to learn exactly what selections are on the menu.

As the population is getting older, the need for reading magnifiers is increasing. People over 40 years of age cannot read small print in low light. Most restaurants use low light for ambience which in turn, makes it difficult for customers to read the menu. Often customers do not carry reading glasses with them to restaurants which makes reading the menu a real problem. Therefore, there is a need to resolve this problem.

To the best of the present inventor's knowledge, there are no reading lenses that are easily utilizable in conjunction with eating and/or drinking establishments and which can also be combined with an advertising medium.

SUMMARY OF THE INVENTION

The present invention is a combination of reading lenses placed onto a medium on which advertisements can be placed. The device can be given away free to advertisers who can advertise their products to individuals while they are visiting an eating and/or drinking establishment so the individual will be interested in purchasing the advertiser's products in addition to being able to read the menu through the lenses.

It is an object of the present invention to provide a carrying medium such as a card which includes a multiplicity of reading lenses of different strengths to accommodate different users who require different strength reading lenses to read print.

It is also an object of the present invention to provide a carrying medium for the lenses which has sufficient space for advertisements so that an advertiser can promote their product on the card. The advertiser most likely will be a seller of food or drink which can be consumed at the eating establishment, thereby enhancing the value of the advertisement. The advertisement will be on the carrying card which carries the different lenses in order to promote the advertiser's product at a location where the consumer is most likely to be influenced by the advertisement and purchase the product.

It is an additional object of the present invention to provide a carrying card which contains the lenses and the advertisement which is of small enough size to fit in a menu.

It is an additional object of the present invention to provide a light source to help illuminate the reading area.

It is a further object of the present invention to provide a multi-lens carrying card to enable a user to shift one lens to an another over a user's eye until the lens with the correct strength has been located.

While the primary focus of the present invention is to be used in eating and/or drinking establishments in order to enable someone who forgot their eyeglasses to be able to read what is on the menu or other food or drink printed document, the present invention can also be utilized as an advertising medium. By way of example, one additional application would be as an insert into the owner's manual of a vehicle. Therefore, if someone forgets their reading glasses and they can drive because they only require glasses for reading and not for distance, an advertising insert can be inserted into the owner's manual. It operates and functions the same way as the above invention but is simply utilized as an advertisement to be placed in an owner's manual. It will be appreciated that other applications wherein an advertisement can be inserted into a written document that would be beneficial to the advertiser and also assist someone who forgets their eyeglasses to read the written document are also within the course and scope of the present invention.

Further novel features and other objects of the present invention will become apparent from the following detailed description, discussion and the appended claims, taken in conjunction with the drawings.

BRIEF DESCRIPTION OF THE DRAWINGS

Referring particularly to the drawings for the purpose of illustration only and not limitation, there is illustrated.

DETAILED DESCRIPTION OF THE PREFERRED EMBODIMENTS

Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claims.

Figure 1:
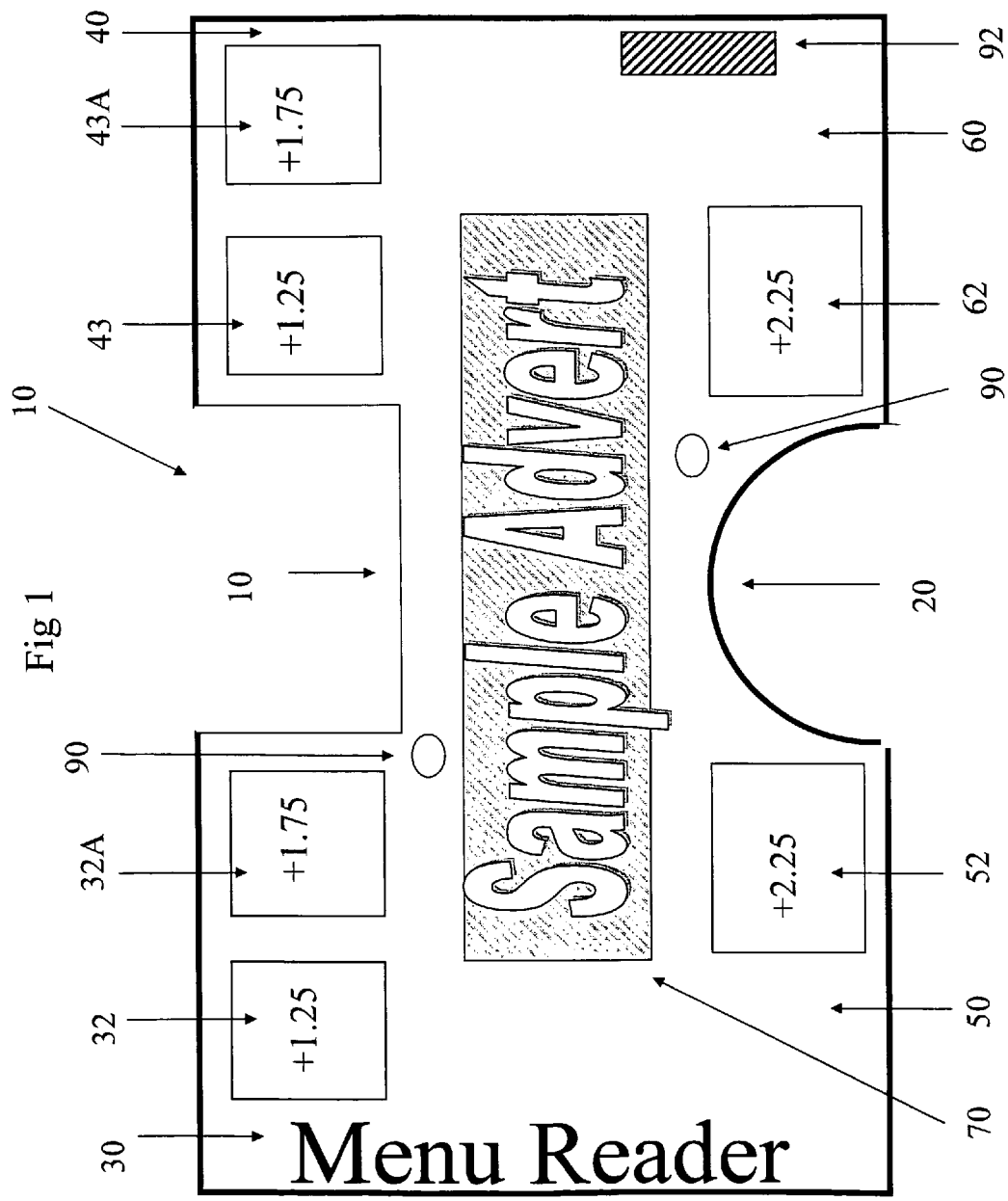
FIG. 1 is a front elevational view of the present invention reading lenses combined onto an advertising medium so that the individual who forgot his or her glasses can read the menu and can also see the advertisement to be induced to buy the product advertised on the advertising medium, the device also contains a source of illumination with an on-off switch.

Referring to FIG. 1, there is illustrated at 10 the present invention reading lens apparatus combined with an advertising medium for use at a food establishment. The reading lens apparatus 10 is generally formed so that there is a U-shaped cutout 20 in the middle so that an individual can place the bridge of his/her nose at the location of the U-shaped cutout 20 on one side in order to be able to align one of the reading lenses with their eyes. The power is in diopters. By way of example, in the upper left corner 30 shown in FIG. 1, the power of the reading lens 32 is 1¼ or 1.75 (32A). In the upper right 40 the power of the reading lens 43 is 1¼ or 1.75 (43A). In the lower left corner 50, the power of the reading lens 52 is 2¼ and in the lower right corner 60, the power of the reading lens 62 is 2¼. It will be appreciated that these are considered conventional reading power strengths that most individuals will need. The present invention uses lenses in the range of 1.00 to 21.00 diopters.

Figures 2, 3:
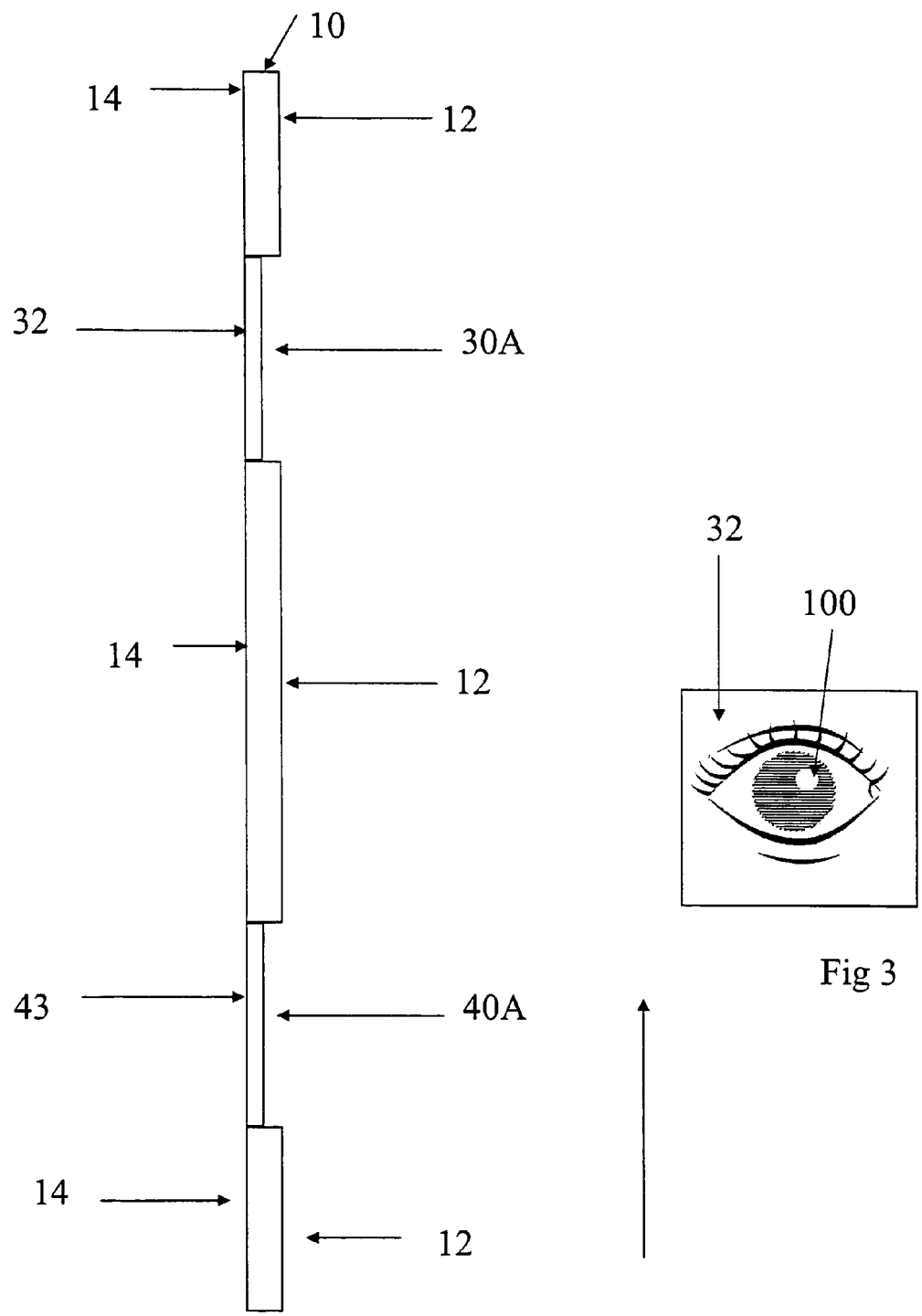
FIG. 2 is a cross-sectional view taken along line 2-2 of FIG. 1.
FIG. 3 shows the device in use where an individual places a reading lens over the user's eye so that the specific strength of reading lenses is in alignment with at least one eye of the individual so that the individual can read the menu or other food or drink listing.

Referring to FIG. 2, the carrying member 10 is comprised of two mirror image sections 12 and 14 with respective cutout openings 30A and 40A sized to enable a respective lens 32 and 43 to fit within the opening. A respective lens 32 and 43 is retained between the two mirror image sections by being affixed between the section at a respective location 30A and 40A. It will be appreciated that lenses 52 and 62 are retained between sections 12 and 14 with cutout windows for the lenses in a similar manner.

Also, in the middle of the apparatus 10 there is an advertisement 70 which in this case advertises a specific type of beer. The device 10 is made of cardboard, fiber board, plastic, polypropylene or other simple, easily discardable material which can retain each respective reading lens 32, 43, 52 and 62 in an opening in an upper corner of the device while the advertisement 70 is in the center of the device 10 and therefore, does not interfere with any reading.

Referring to FIG. 3, the individual places the reading lens apparatus combined with an advertising medium 10 so that the U-shaped cutout such as 20 rests above the bridge of the individual's nose or is along the length of the individual's nose so that one of the lenses such as 32 can be aligned with one of the individual's eyes 100. In this way, the individual can read what is on the menu. This is especially beneficial if the individual has forgotten his reading glasses or if in fact, the individual does not necessarily need reading glasses but the restaurant or nightclub is not well lit and it is difficult to read the menu or other food or drink lists that are presented.

Therefore, through use of the present invention, reading lenses of different powers are retained within the invention and the invention enables an individual to easily switch from one reading strength to another so that it is most likely to accommodate the appropriate strength required by the individual in order to read the specific menu. Further, an advertisement is placed at a prominent location on the reading lens apparatus combined with an advertising medium, therefore giving an incentive to advertisers to essentially pay for the device and have it as a giveaway which can be placed inside menus or inside other food or drink listings so that an individual can see the advertisement very quickly as soon as they open the menu and then of course utilize the lenses to read the various information on the menu.

The present invention is a flat card that could be stored on the table in the condiment holder or have a pocket in the back of the menu itself. The present invention would have two to four magnifying powers (one or two on each side) with advertisements printed on the face of the present invention.

The magnifiers could be convex lenses, pinhole or Fresnel flat lenses made of plastic. Glass or other refractive transparent material could also be used. The card could be made of paper or cardboard and then laminated in a protective plastic film. It could also be made of plastic, wood or metal.

A light source 90 such as an LED could be integrated in the card with a micro pressure sensitive switch 92 to illuminate the menu in dark areas. Power could be provided by a small battery or a solar cell or a combination of both.

In addition, the present invention can be utilized as an advertising medium for anyone who has a printed documents and wishes to insert the present invention in the printed document so someone who forgot their reading glasses can read the print in the document. One example would be in an owner's manual or operating manual for a vehicle where an insert can be inserted which is exactly the same as set forth above and an advertisement for the automobile company can be placed at the advertising location 70 so that someone can advertise their vehicle and assist someone who forget their eyeglasses in being able to read the print. This of course assumes that the person requires the glasses for reading and can drive without corrective lenses.

The present invention can also be incorporated as an advertising medium in other various printed matter where the advertiser wishes to advertise their product or their service and assist the reader in reading the printed matter contained where the insert has been placed.

Of course the present invention is not intended to be restricted to any particular form or arrangement, or any specific embodiment, or any specific use, disclosed herein, since the same may be modified in various particulars or relations without departing from the spirit or scope of the claimed invention hereinabove shown and described of which the apparatus or method shown is intended only for illustration and disclosure of an operative embodiment and not to show all of the various forms or modifications in which this invention might be embodied or operated.

What is claimed is:

1. An apparatus comprising:
   a. a rectangular body having a pair of mirror image sections, each section having a top horizontal edge with a matching central cutout section, a bottom horizontal edge with a matching U-shaped cutout section aligned with the central cutout section, a first side edge and a second side edge, a matching first multiplicity of pairs of spaced apart cutout openings aligned in a horizontal row adjacent the respective top edges and the paired cutout openings located on both sides of the central cutout section, a second multiplicity of spaced apart cutout openings aligned in a horizontal row adjacent the respective bottom edges and located on opposite sides of the U-shaped cutout section, each of the first and second multiplicity of matching cutout openings sized to fit and retain a respective predetermined optical reading lens having different diopters;
   b. each respective predetermined optical reading lens retained between the mirror image sections of material so that each predetermined optical reading lens is usable to read print, the configuration of the central cutout and the U-shaped cutout enabling the bottom edge to be placed over a reader's nose to enable a reader to see through a respective one of the predetermined optical reading lenses in the bottom horizontal row and the central cutout enabling the top edge to be placed over a body part to enable a reader to see through a respective one of the predetermined optical reading lenses in the top horizontal row;
   c. a pair of built-in LED light sources retained in the rectangular body and respectively located adjacent the horizontal row of predetermined optical reading lenses adjacent the top edges and adjacent the horizontal row of predetermined optical reading lenses adjacent the bottom edges, the LED light sources powered by a battery connected to a built-in micro pressure sensitive switch retained in the rectangular body;
   d. an advertisement advertising a consumable beverage or food item incorporated onto a portion of at least one of the mirror image sections of material;

e. the rectangular body sized to fit into a menu in a food restaurant; and
f. the configuration of the central cutout and U-shaped opening enabling a reader to position the apparatus at any desired location to facilitate aligning an eye with one of the predetermined optical lenses and the built-in LED light source facilitating clear reading of printed material.

2. The apparatus in accordance with claim 1, wherein the mirror image sections are made out of cardboard.

3. The apparatus in accordance with claim 1, wherein the predetermined optical lenses are selected from the group in a range of 1.0 to 21.0 diopters.

* * * * *